US009467312B2

(12) United States Patent
Ganzerli et al.

(10) Patent No.: US 9,467,312 B2
(45) Date of Patent: Oct. 11, 2016

(54) SPEED IMPROVEMENT FOR A DECISION FEEDBACK EQUALIZER (71) Applicant: NXP B.V., Eindhoven (NL)

(72) Inventors: Marcello Ganzerli, Eindhoven (NL); Gerrit Willem den Besten, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/202,751

(22) Filed: Mar. 10, 2014

(65) Prior Publication Data

US 2015/0256362 A1 Sep. 10, 2015

(51) Int. Cl.
*H04L 27/01* (2006.01)
*H04L 25/03* (2006.01)

(52) U.S. Cl.
CPC ... *H04L 25/03057* (2013.01); *H04L 25/03146* (2013.01); *H04L 2025/0349* (2013.01); *H04L 2025/03484* (2013.01)

(58) Field of Classification Search
CPC .............. H04L 25/03057; H04L 2025/03363; H04L 2025/03496
USPC ........................................................ 375/233
See application file for complete search history.

(56) References Cited

U.S. PATENT DOCUMENTS

| 7,869,497 | B2 | 1/2011 | Benvenuto et al. | |
| 8,711,922 | B2 * | 4/2014 | Shen et al. ................. | 375/233 |
| 2002/0181575 | A1 | 12/2002 | Birru | |
| 2008/0187036 | A1 | 8/2008 | Park et al. | |
| 2010/0054324 | A1 * | 3/2010 | Bulzacchelli ..... | H04L 25/03057 375/233 |
| 2013/0243071 | A1 * | 9/2013 | Chmelar ....................... | 375/233 |
| 2013/0322512 | A1 * | 12/2013 | Francese ........... | H04L 25/03146 375/233 |

OTHER PUBLICATIONS

Kaviani, K.; et al.; "A Tri-Modal 20-Gbps/Link Differential/DDR3/GDDR5 Memory Interface," Solid-State Circuits, IEEE Journal of , vol. 47, No. 4, pp. 926-937, Apr. 2012.
Emami-Neyestanak, Azita et al; "A 6.0-mW 10.0-Gb/s Receiver With Switched-Capacitor Summation DFE"; IEEE Journal of Solid-State Circuits, vol. 42, No. 4; pp. 889-896 (Apr. 2007).
Extended European Search Report for counterpart application 15155041.5 (Jul. 9, 2015).

* cited by examiner

Primary Examiner — David S Huang (57) ABSTRACT

Circuits, apparatus, and methods are disclosed for decision feedback equalization. In one embodiment, an apparatus includes a plurality of time-interleaved slices for processing an input data stream. Each of the slices includes a sampler circuit, a multiplexer, and a latch. In each slice, the multiplexer and the sampler circuit provide sampled output data corresponding to one of a plurality of different versions of the input data stream at times designated uniquely for the slice, according to one or more selection signals. The selection signals are derived from a output of the multiplexer of at least one other of the time-interleaved slices. The latch provides a controlled output in response to the multiplexer and the sampler circuit, as a function of the designated unique times.

19 Claims, 7 Drawing Sheets

SPEED IMPROVEMENT FOR A DECISION FEEDBACK EQUALIZER

A digital transmission is susceptible to impairments resulting in degradation of signal quality. Receivers for digital communications must be capable of recovering transmitted data from the received analog signal. The received signal may be corrupted by Intersymbol Interference (ISI) introduced by the transfer function of the communication channel, as well as by noise and crosstalk.

Currently, automatic adaptive equalizers are employed to minimize the signal loss. Automatic adaptive equalizers may be categorized into linear and non-linear types. Linear equalization can compensate for signal loss introduced by the transfer function of the communication channel, but it enhances noise and crosstalk at high frequencies. A widely used non-linear equalizer is the decision feedback equalizer (DFE), which can compensate for signal loss introduced by a channel transfer function without enhancing noise and crosstalk at high frequencies. The DFE aims to subtract an estimation of the ISI coming from post-cursors from the digital transmission from the input signal. A typical DFE circuit with one correction tap includes a sampler circuit quantizing the input signal and holding its output for a clock cycle, and a summer positioned at the input of the sampler circuit. The sampler circuit samples and quantizes the output of the summer. The summer subtracts the estimated ISI from the input signal. The output of the sampler circuit is multiplied by a coefficient and fed into the summer, in order to update the value that the summer subtracts to compensate for the ISI. This topology is referred to as direct feedback DFE.

Analog DFE implementations require sufficient settling of the DFE corrections, or updates, at the summer within one-interval (UI) delay. A common practice to relax the speed requirement of the DFE is called speculation. In a DFE with one correction tap employing speculation, two sampler circuits with non-zero thresholds sample the input signal. The sampler circuits produce two tentative decisions that are fed into a multiplexer which is used to select one of the tentative decisions based on the last DFE output. Because the selection delay of the multiplexer is typically lower than the settling delay of the summer used in direct-feedback decision feedback equalizers, the speculation technique allows operation at higher speed.

To achieve operation at higher data rates, a flip-flop that is typically coupled to the output of the multiplexer may be removed from the speculative feedback connection. Removing the flip-flop at the output of the multiplexer reduces the delay of the critical timing loop to the propagation delay of one multiplexer, but requires additional measures to avoid race conditions. At relatively low data rates, race conditions can happen if a chain of state changes through the speculative feedback connection and causes a change in the multiplexer output before the multiplexer output is resampled. Race conditions can also happen if the multiplexer selection input changes before the next decision is available from the sampler circuits, and the multiplexer output is sampled too early. Due to the aforementioned constraints, the clock phase used to resample the multiplexer output is calibrated as a function of the data rate in existing implementations of 1-tap speculative feedback equalizers where the flip-flop at the output of the multiplexer is removed from the speculative feedback connection.

Methods, circuits, and apparatus for performing decision feedback equalization are described. In some embodiments, a method for operating a decision feedback equalizer involves configuring a decision feedback equalizer to employ time interleaving and speculation using multiplexers, which are auto-aligned with the decisions of the sampler circuits and are configured to be insensitive to their selection input during a fraction of a clock period. The use of time interleaving in combination with multiplexers insensitive to their selection input during a fraction of the clock period, allows the removal of flip-flops from the multiplexer output in the speculative decision feedback architecture. This allows for delay of the speculative feedback connection to be reduced to one multiplexer delay while also removing the need for a calibration mechanism to select the clock phase used to resample multiplexer outputs as a function of the data-rate.

In some embodiments, a time-interleaved decision feedback equalizer includes a direct feedback connection having summers, sampler circuits, multiplexers, and latches and a speculative feedback connection having multiplexers. Each of the summers is configured to receive a direct feedback signal from a corresponding latch node and add a direct feedback correction to a received input to compensate for the ISI coming from the second post-cursor. The outputs of the multiplexers are connected to a corresponding latch and a selection input of an adjacent multiplexer.

The multiplexers may also have a selection enable input for triggering either a selection enable phase or a selection disable phase. In an embodiment, an adaptive automatic equalizer includes time-interleaved sampling slices operating in parallel. Each of the sampling slices includes a summer, two sampler circuits, a multiplexer and a latch. The summer adds a direct feedback correction to the received input signal to compensate for the ISI coming from the second post-cursor. Two sampler circuits are connected to the summer output, and the sampler circuit outputs are connected to the data inputs of the multiplexers. The multiplexer output of each slice is coupled to the selection input of the multiplexer of an adjacent slice. The multiplexers are configured to ignore the selection input during a selection disable phase and to feed one of the data inputs to the multiplexer output during a selection enable phase. The selection enable phase and selection disable phase are triggered by a selection enable input.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving decision feedback equalization. While not necessarily so limited, various aspects may be appreciated through a discussion of examples using this context.

Some various example embodiments are directed to an apparatus (e.g., a DFE) having a plurality of time-interleaved slices for processing an input data stream using time interleaving and speculation in a manner that inhibits race conditions. Each of the slices includes a sampler circuit, a multiplexer, and a latch. In each slice, the multiplexer and the sampler circuit provide sampled output data corresponding to one of a plurality of different versions of the input data stream at times designated uniquely for the slice, according to one or more selection signals. In some implementations, for example, the selection signals are feedback signals derived from a output of the multiplexer of at least one other of the time-interleaved slices. The latch is configured to provide a controlled output in response to the multiplexer and the sampler circuit, as a function of the designated unique times.

In some embodiments, an apparatus (e.g., a DFE) includes at least two time-interleaved slices. Each slice includes at least two sampler circuits, configured to sample different versions of an input data stream, a multiplexer, and a latch. A speculative feedback connection couples the time-interleaved slices via the multiplexers. The multiplexer in each time-interleaved slice selects and outputs data from one of the at least two sampler circuits, according to one or more selection signals. The selection signals are derived from outputs of one or more multiplexers of one or more other time-interleaved slices, and are enabled during a selection enable phase and disabled during a selection disable phase.

In some embodiments, a method for decision feedback equalization is provided. An input data stream is sampled with a plurality of time-interleaved slices. Each of the plurality of time-interleaved slices includes a plurality of sampler circuits, a multiplexer, and a latch. A corrective value is speculated in a speculative feedback loop by using the multiplexer to select and output data from one of the plurality of sampler circuits. The selection is performed as a function of an output signal from a multiplexer of another one of the plurality of time-interleaved slices. Changes in the selection of the multiplexer are inhibited during a time period before the data from the sampler circuits of the corresponding slice becomes available.

In some embodiments, race conditions are inhibited by disabling the selection performed by the multiplexer in each slice for a period of time preceding the time uniquely designated for the slice. Each slice is also configured to provide the selection signal used by one or more others of the plurality of time-interleaved slices, at times designated uniquely for such time-interleaved slices. While selection is disabled, the multiplexer is insensitive to the selection signal. In some embodiments, the multiplexers include a selection enable input for triggering either a selection enable phase or a selection disable phase.

In some embodiments, each of the time-interleaved slices is configured to also include a direct feedback path, having at least one summer circuit. The summer circuit is configured to add one or more direct feedback corrections to the received input signal to compensate for the ISI coming from the post-cursors which are not compensated by the speculative corrections. The sampler circuits in the time-interleaved slice are connected to the summer output, and the sampler circuit outputs are connected to the data inputs of the multiplexers.

Figure 1A:
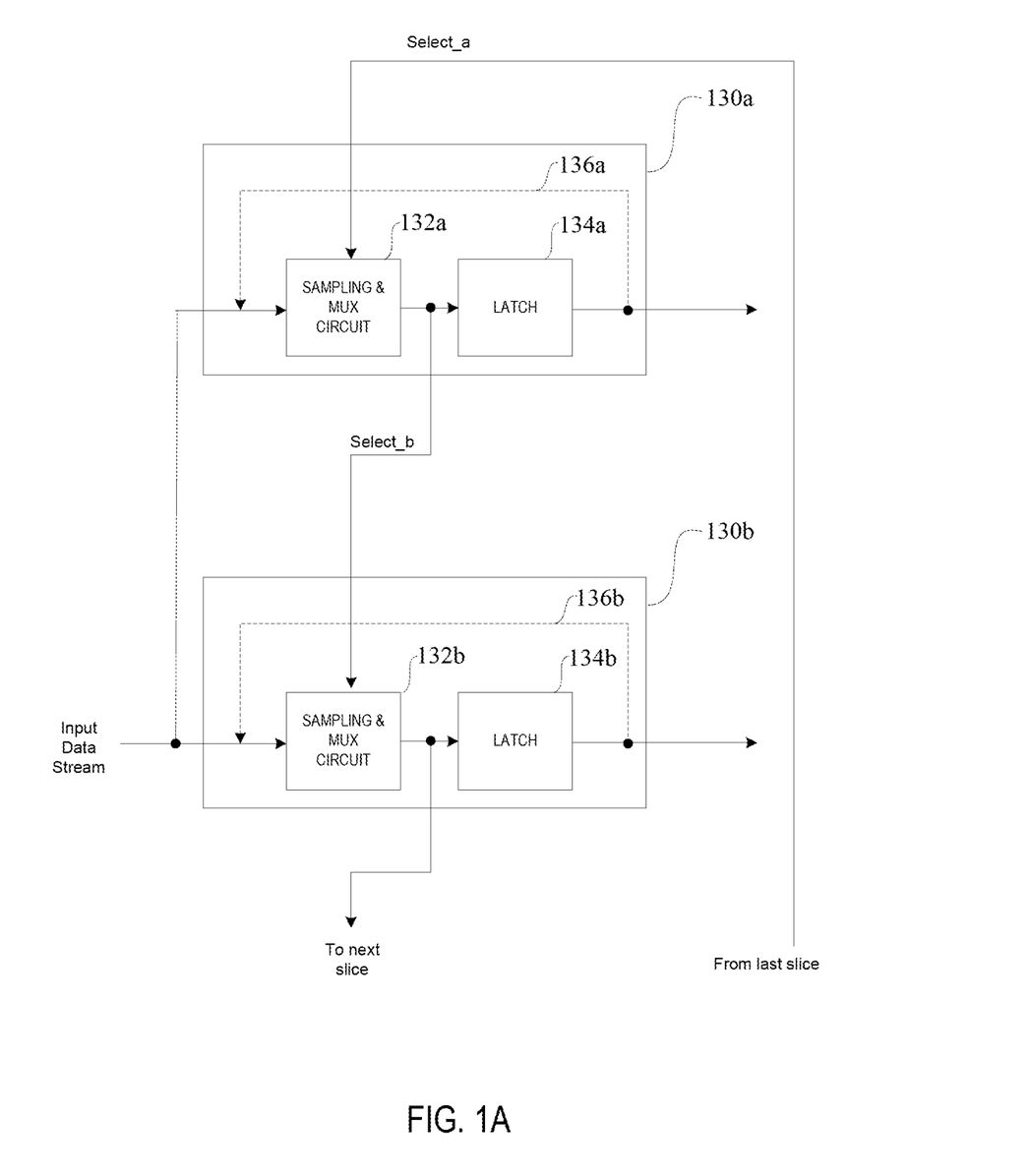
FIG. 1A shows a schematic block diagram of a first decision feedback equalizer, in accordance with an embodiment of the invention.
Figure 1B:
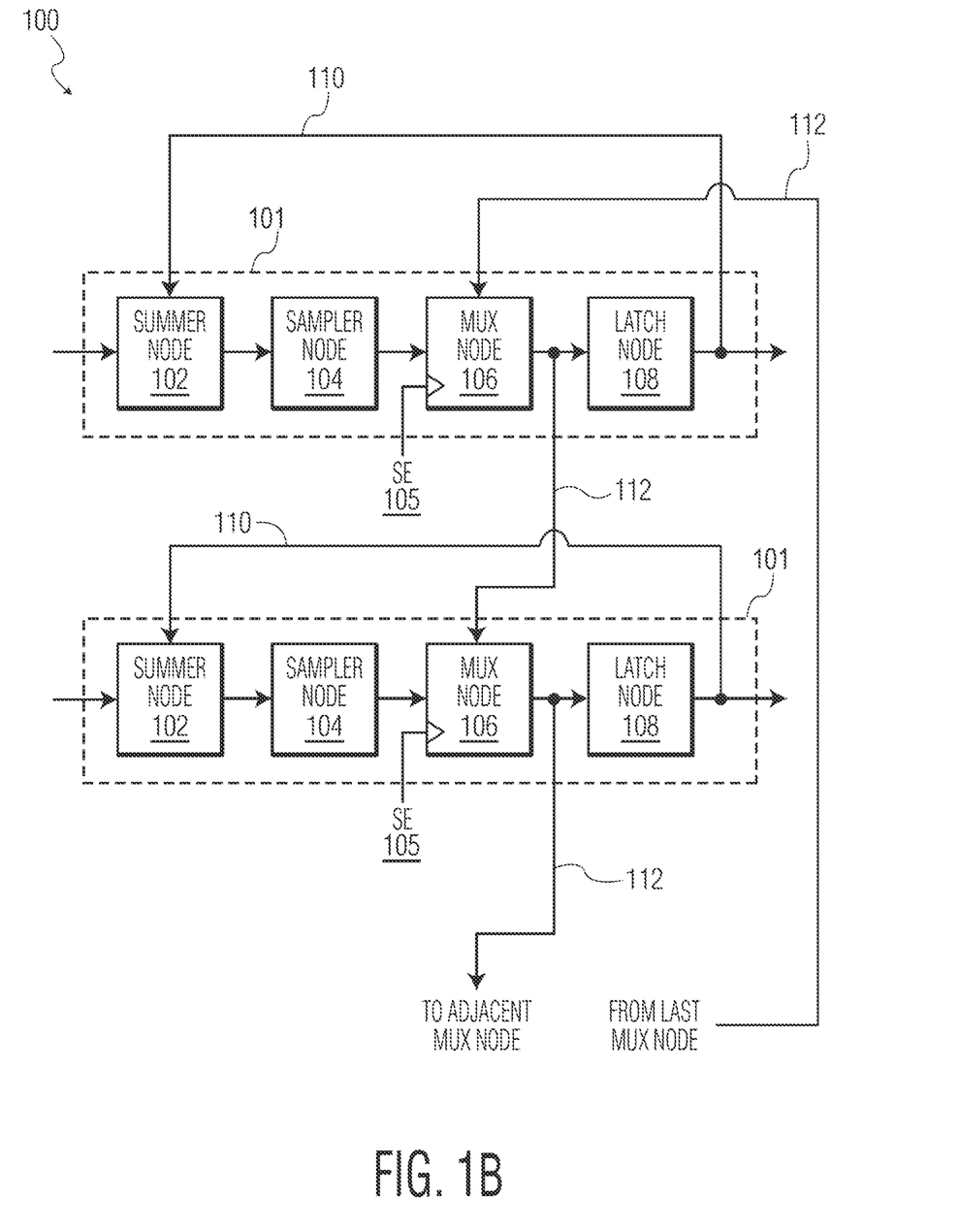
FIG. 1B shows a schematic block diagram of a first decision feedback equalizer, in accordance with an embodiment of the invention.

Turning now to the figures, FIGS. 1A and 1B show block diagrams of two example decision feedback equalizers, in accordance with one or more embodiments. FIG. 1A shows a schematic block diagram of a first decision feedback equalizer, in accordance with an embodiment of the invention. The decision feedback equalizer, includes a plurality of slices (e.g., 130a, 130b) configured to receive and process an input data stream. Each of the slices is configured to sample and process the input data stream at times designated uniquely for the slices. The uniquely designated times are offset so that the times of each slice is interleaved with times of other slices. For ease of reference, slices having such interleaved designated times may be referred to as time-interleaved.

Each of the plurality of slices includes a sampling and multiplexing circuit (132a, 132b) and a latch (134a, 134b) configured to implement at least one speculative tap of the decision feedback equalizer. Each slice is configured to provide a selection signal (e.g., select_a, select_b) for use by one or more other slices at the times designated uniquely for the slices. At the uniquely designated times for the slice, the sampling and multiplexing circuit (132a, 132b) provides sampled output data corresponding to one of a plurality of different versions of the input data stream, in response to one of the selection signals. The latch (134a, 134b) provides controlled output from the sampling and multiplexing circuit (132a, 132b) as a function of the designated unique times.

In some embodiments, the decision feedback equalizer also includes a feedback path (136a, 136b) configured to implement a direct feedback tap. For ease of explanation, the examples are primarily described with reference to slices implementing 1 speculative tap and 1 direct feedback tap. However, the examples may be adapted to implement larger numbers of speculative or direct feedback taps.

FIG. 1B shows a schematic block diagram of another decision feedback equalizer 100 in accordance with an embodiment of the invention. The decision feedback equalizer 100 is depicted in general terms with respect to FIG. 1B for clarity. More specific embodiments of decision feedback equalizers will be described below with reference to FIGS. 2 and 3. In the depicted embodiment, the decision feedback equalizer 100 includes multiple data slices 101 (i.e., circuit segments). Although FIGS. 1A and 1B each depict two slices (101/130), the decision feedback equalizers may include larger numbers of slices, as will be described in greater detail below. Each slice 101 includes a summer 102, a sampler node 104 having two sampler circuits, a multiplexer (MUX) 106, and a latch 108. The decision feedback equalizer also includes a direct feedback connection 110, and a speculative feedback connection 112.

The decision feedback equalizer 100 overcomes issues related to limited channel bandwidth that lead to the broadening of transmitted pulses (of a transmitted signal) over more than one unit interval, and subsequent intersymbol interference. When a transmitted pulse broadens over one unit interval, the signal becomes distorted to the point that a sampler circuit is unable to detect the individual bits of the transmitted signal. The decision feedback equalizer 100 is configured to compensate for the intersymbol interference coming from the first two post-cursors without amplifying noise or crosstalk.

The decision feedback equalizer 100 allows high-speed operation because the critical timing loop only includes the propagation delay of one multiplexer. Additionally, race-free operation is guaranteed without calibrating the clock phase used to resample the MUX output as a function of the data-rate. This is achieved by configuring the multiplexers 106 (see FIG. 2) to be insensitive to their selection input for a fraction of each clock period, by means of the selection enable input 105 and by auto-aligning the multiplexer output with the decisions of the sampler circuits of sampler node 104. The summer 102 adds a direct feedback correction to the received input to compensate for the intersymbol interference coming from the second post-cursor. Two sampler circuits having non-zero thresholds make two speculative decisions to compensate for the intersymbol interference coming from the first post-cursor. The decision of one of the two sampler circuits is selected by the multiplexer 106 whose selection input is driven by the speculative feedback connection 112.

The two sampler circuits of the sampler node 104 may be implemented as two-phase dynamic sense amplifiers having a latching phase followed by a reset phase. During the latching phase, the two sampler circuits sample and latch the input signal. During the reset phase, the outputs of the sampler circuits are reset.

The multiplexer 106 may be implemented with differential cascade voltage switch logic and have a selection enable phase and a selection disable phase. During the selection enable phase, the multiplexer 106 is triggered by the decision of the sampler node 104, following shortly after the sampling. During the selection disable phase, the multiplexer 106 is configured to be insensitive to the selection input. The output of the multiplexer 106 may be reset during the selection disable phase. The output of the multiplexer 106 is connected to the selection input of an adjacent multiplexer through the speculative feedback connection 112, as will be discussed below.

The latch 108 is configured with a transparent phase and a latching phase. The output of the latch 108 is connected to the summer 102 via the direct feedback connection 110. The summer subtracts a correction value from its input to compensate for the second post-cursor. The polarity of the correction value is decided by the polarity of the digital output of the latch feeding the summer.

Figure 2:
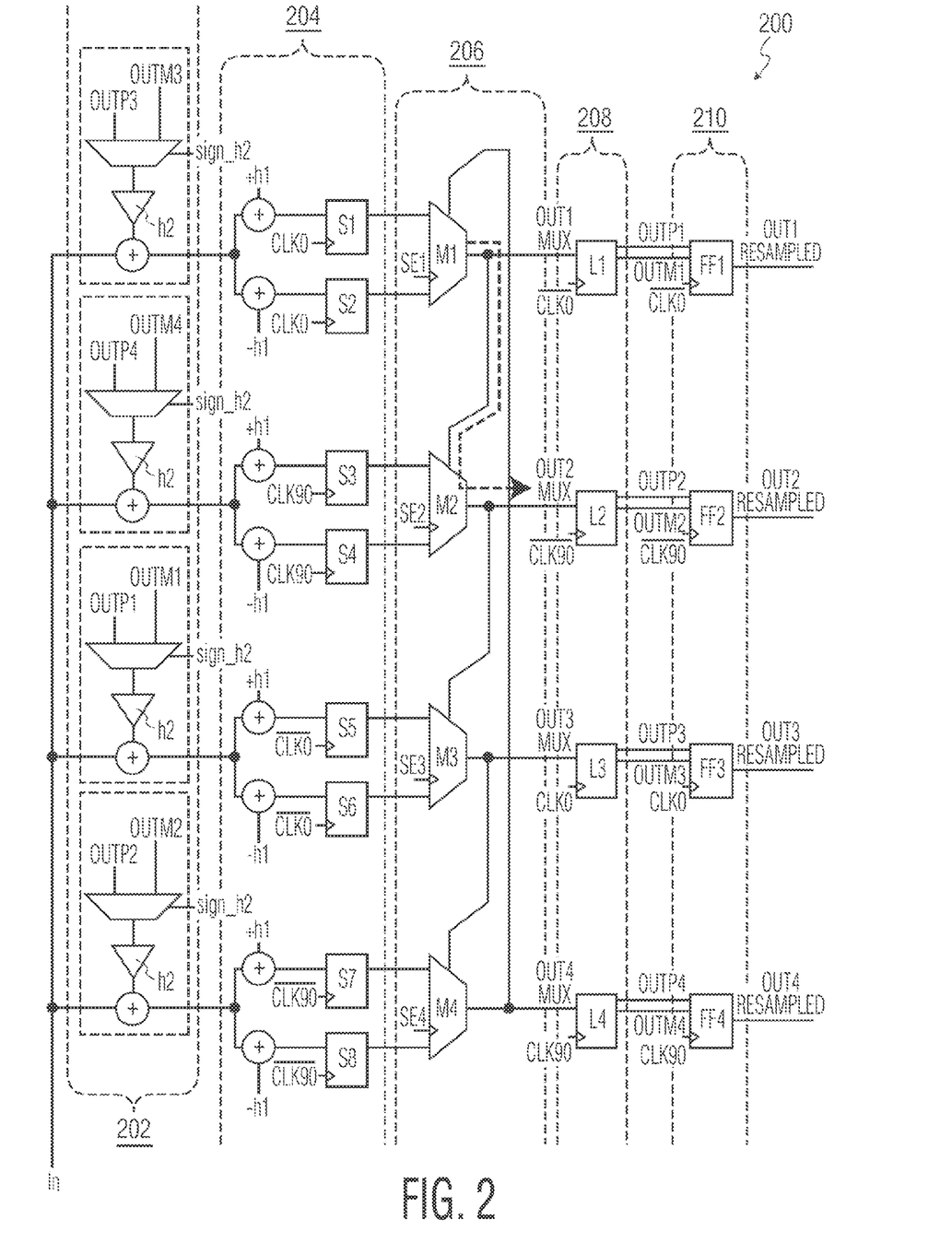
FIG. 2 shows a schematic block diagram illustrating one embodiment of a circuit for implementing a decision feedback equalizer, in accordance with an embodiment of the invention.

FIG. 2 is a schematic block diagram illustrating one embodiment of a circuit for implementing a decision feedback equalizer 200 in accordance with an embodiment of the invention. The decision feedback equalizer 200 implements one speculative tap and one direct-feedback tap. The decision feedback equalizer 200, as discussed with reference to FIGS. 1A and 1B above, is formed of time-interleaved slices including one summer 202, two sampler circuits 204, a multiplexer 206, and a latch 208. In some implementations, each time-interleaved slice may also include a flip flop 210.

For clarity, similar components are enumerated in FIG. 2 with callout brackets. For example, a single bracket 202 is used to indicate four separate summer regions, which are individually identified by dashed line regions within the bracket. The bracket may be used to refer to an individual summer in each respective slice. Likewise, other similar components are identified by callout brackets. Each summer 202 is connected with a received signal, identified as "In." The received signal, as described above, may be a non-return to zero binary signal, corrupted by intersymbol interference introduced by the communication channel. Each summer 202 is also connected with the output of one or more of the latches 208 (L1-L4). The differential output (OUTP3, OUTM3) is an example of output from latch L3. Although not depicted in FIG. 2, this coupling forms the direct feedback connection described above in FIGS. 1A and 1B.

The output of each summer 202 feeds into the two sampler circuits 204 (S1-S8). The two sampler circuits 204 have non-zero thresholds and make two speculative decisions to compensate for the intersymbol interference coming from the first post-cursor. The outputs of the sampler circuits 204 are connected with a multiplexer 206 selecting one of the outputs of the two sampler circuits 204 depending on the last received bit. In some implementations, each of the multiplexers M1, M2, M3, M4 receives two data inputs from a pair of sampler circuits (i.e., S1, S2) and a selection input that is the output of an adjacent multiplexer. For example, the output of multiplexer M3 is coupled with the selection input of the multiplexer M4. This feedback loop is the speculative feedback described above with reference to FIGS. 1A and 1B. The output of each multiplexer is also coupled with a corresponding latch. The output of each latch is coupled with a flip flop. In this example, each multiplexer selects sampled values from two speculative paths (i.e., S1, S2). However, in some implementations, the multiplexer in each of the time-interleaved slices may select values from a larger number of speculative paths (e.g., >2).

The depicted embodiment illustrates a decision feedback equalizer 200 having four slices, although any other number of slices higher than one may be implemented. Race-free operation of the four slices in the decision feedback equalizer 200 is possible by the use of time interleaving in combination with multiplexers M1, M2, M3 and M4 that are insensitive to their selection input during a fraction of the clock period and auto-aligned with the decisions of the sampler circuits of the corresponding slice. Each multiplexer (i.e., M1, M2, M3 and M4) has a selection enable phase and a selection disable phase that is triggered by the inputs SE1, SE2, SE3 and SE4. The start of a selection enable phase of one of the multiplexers M1, M2, M3 and M4 is synchronous with the start of the latching phase of the sampler circuits of the corresponding slice. In the selection enable phase, the multiplexer selects one of the two input signals based on the selection input (received from an adjacent multiplexer). The duration of the selection disable phase, in one embodiment, is greater than or equal to one unit interval, or in other words, the amount of time to transmit one symbol or bit. The principles here described may be applied to decision feedback equalizer architectures implementing one or more speculative taps and any number of direct-feedback taps.

The depicted implementation allows driving the capacitive loads of the multiplexer selection inputs and the decision feedback equalization summing node with separate stages. For example, the multiplexers M1-M4 drive the speculative loop, while the slave latches L1-L4 drive the direct feedback connection. The load capacitance driven by the multiplexers M1-M4 is:

$$C_{LOAD,M1-M4} = C_{IN,LATCH} + C_{INTERCONNECT,MUX} + C_{SEL,MUX}$$

where $C_{IN,LATCH}$ is the input capacitance of the latches L1-L4, $C_{INTERCONNECT,MUX}$ is the capacitance of the connection to the multiplexer of the next or adjacent slice, and $C_{SEL,MUX}$ is the capacitance of the selection input of the multiplexer of the next or adjacent slice.

The load capacitance driven by the latches L1-L4 is:

$$C_{LOAD,L1-L4}=C_{IN,FF}+C_{INTERCONNECT,SUMMER}+C_{IN,SUMMER},$$

where $C_{IN,FF}$ is the input capacitance of the flip-flops FF1-FF4, $C_{INTERCONNECT,SUMMER}$ is the capacitance of the feedback connection to the summer and $C_{IN,SUMMER}$ is the input capacitance of the summer. Decoupling the capacitive loads of the speculative loop and the direct feedback loop enables a higher operating speed to be achieved.

Figure 3:
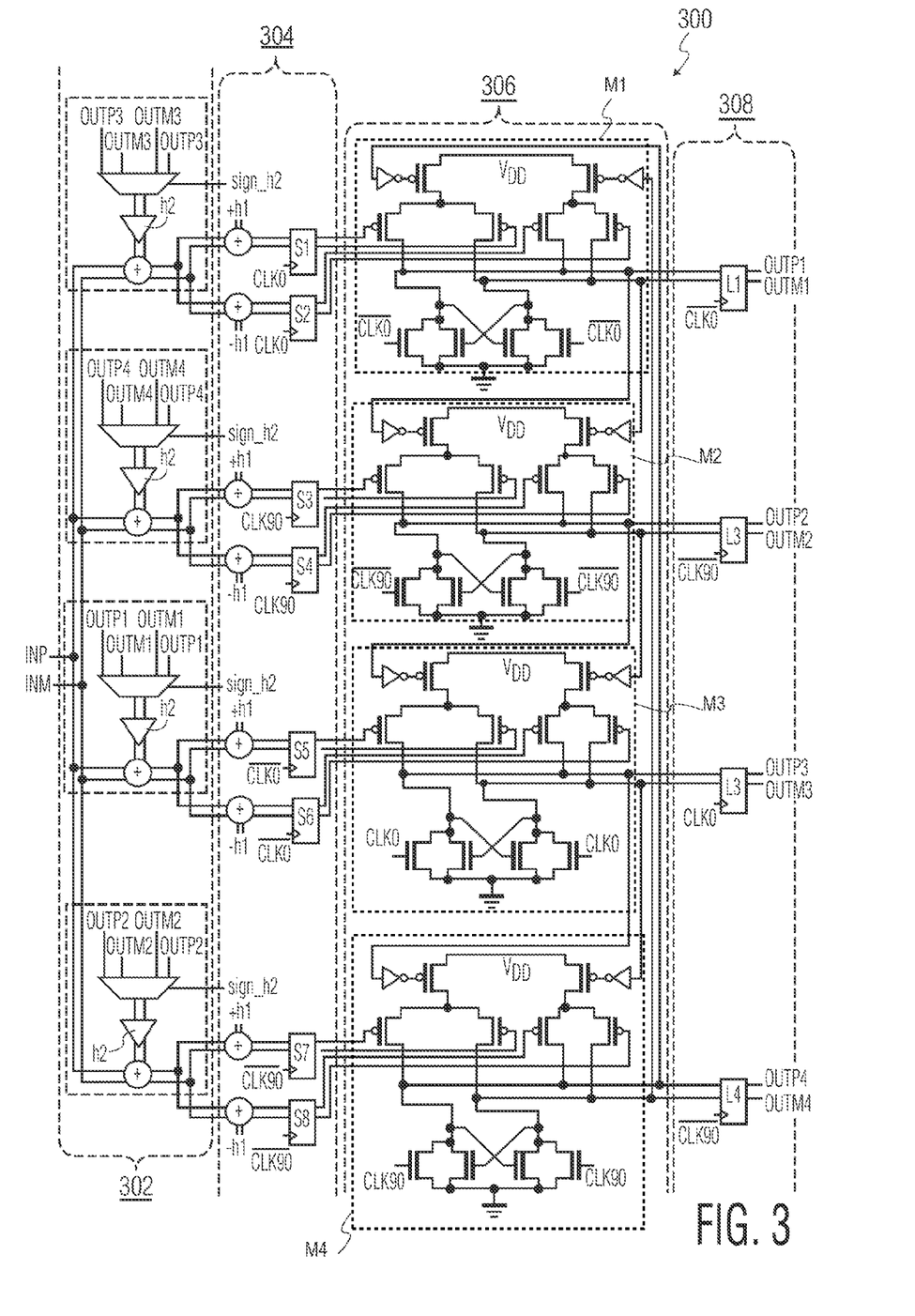
FIG. 3 shows a schematic block diagram illustrating one embodiment of a circuit for a decision feedback equalizer, in accordance with an embodiment of the invention.

FIG. 3 is a schematic block diagram illustrating one embodiment of a circuit 300 for a decision feedback equalizer in accordance with an embodiment of the invention. Like the decision feedback equalizer of FIG. 2, the decision feedback equalizer 300 has one speculative tap and one direct-feedback tap. The decision feedback equalizer 300 is configured to receive a differential input (INP, INM) at a plurality of time-interleaved slices. Each slice includes a summer 302, two sampler circuits 304, a multiplexer 306, and a latch 308.

Each summer 302 is connected to the differential input signal (INP, INM) and to the output of one of the latches 308. The differential output (OUTP3, OUTM3) is an example of output from the latch L3. The connection between the outputs of the latches and the summers as illustrated in FIG. 3, forms the direct feedback connection described above in FIGS. 1A and 1B.

The output of the summer 302 feeds into the two sampler circuits 304. The two sampler circuits 304 may be implemented as two-phase dynamic sense amplifiers having a latching phase followed by a reset phase. During the latching phase, the two sampler circuits 304 sample and latch the input signal. During the reset phase, the output nodes of the two sampler circuits 304 are shorted to the supply voltage $V_{DD}$. The outputs of the two sampler circuits 304 are connected to a multiplexer 306 implemented with differential cascade voltage switch logic. Each of the multiplexers (depicted here as respective circuits M1, M2, M3, and M4) receives its data inputs from a pair of sampler circuits (i.e., S1, S2) and its selection input from the output of an adjacent multiplexer. For example, the output of the multiplexer M3 is coupled with the selection input of the multiplexer M4. This forms the speculative feedback connection described above with reference to FIGS. 1A and 1B. The output of each multiplexer is also coupled with a corresponding latch. The multiplexers have a selection disable phase and a selection enable phase. During the selection disable phase, the outputs of the multiplexers are reset to the ground voltage and therefore insensitive to the selection input. During the selection enable phase, the multiplexer latches the output of one of the two sampler circuits accordingly to the selection input. The multiplexers are auto-aligned with the decisions of the sampler circuits, i.e. their output can only change after a valid decision is available from the sampler circuits. This is obtained by resetting the outputs of the sampler circuits to the supply voltage $V_{DD}$ and having a PMOS input pair in the multiplexers. The output of the multiplexers can only change when the gate to source voltage of one of the PMOS input transistors of the multiplexer exceeds the PMOS transistor threshold voltage. When this happens, a valid decision is already available at the output of the corresponding sampler circuit. In every slice, the latch 308 holds its output while the multiplexer 306 is reset.

As indicated above, race conditions may arise in a speculative decision feedback equalizer, where the speculative feedback loop only includes one multiplexer. The above described selection disable phase and the alignment of the multiplexer with the decisions of the sampler circuits allow race conditions to be inhibited.

The depicted embodiment illustrates a decision feedback equalizer having four slices, although any other number of slices higher than one may be implemented.

Figure 4:
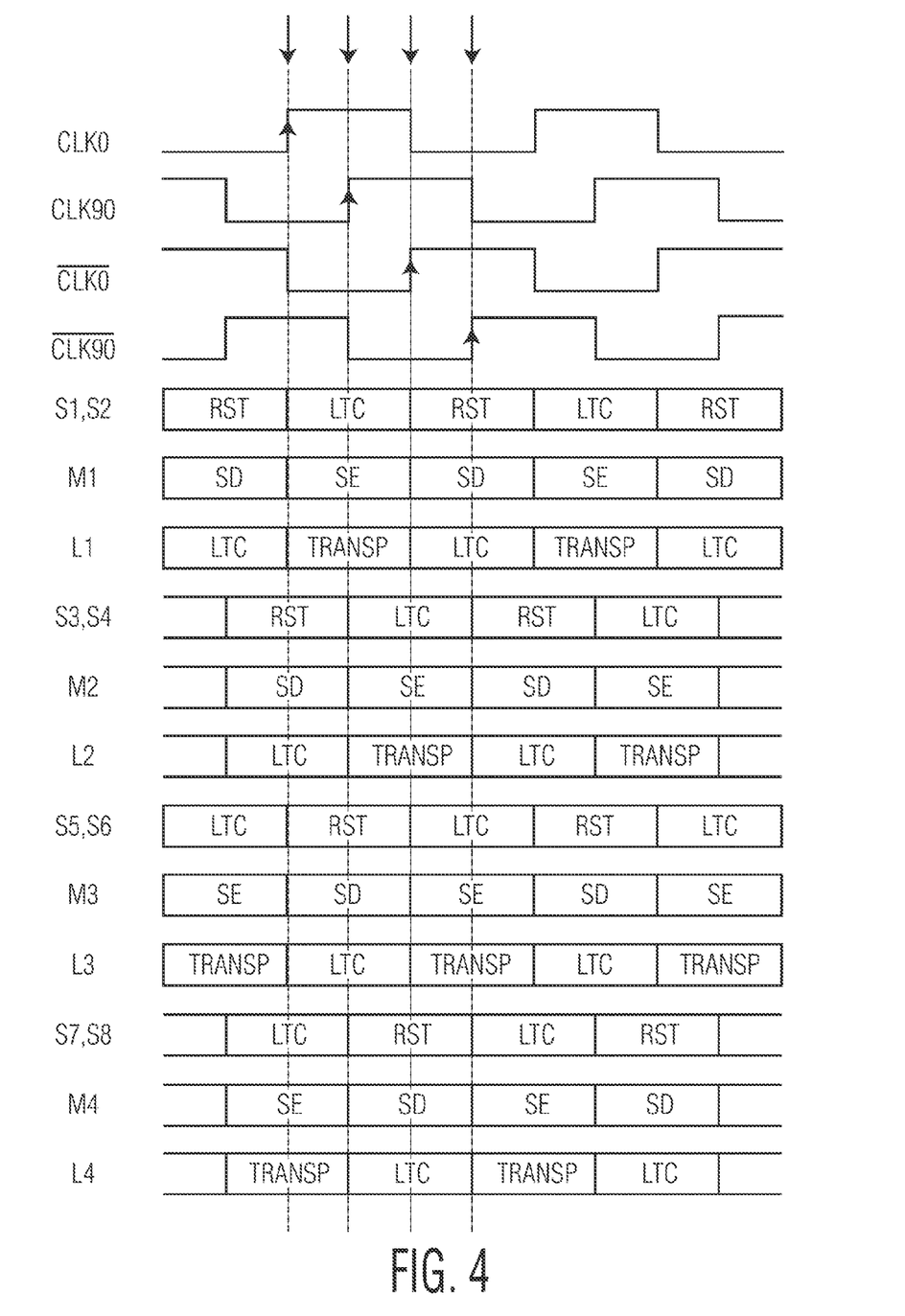
FIG. 4 shows one embodiment of a timing diagram for the decision feedback architecture illustrated in FIG. 3.

FIG. 4 is one embodiment of a timing diagram for the decision feedback equalizer architecture illustrated in FIG. 3. Referring to FIG. 4, with continued reference to FIG. 3, the illustrated timing diagram is a depiction of the selection disable phase being equal to or greater than one symbol time. The reset phase (RST) of the sampler circuits in a given slice is synchronous to the selection disable phase (SD) of the multiplexer and a latching phase (LTC) of the latch. The latching phase (LTC) of the sampler circuits is synchronous to the selection enable phase (SE) of the multiplexer and the transparent phase (TRANSP) of the latch.

Figure 5:
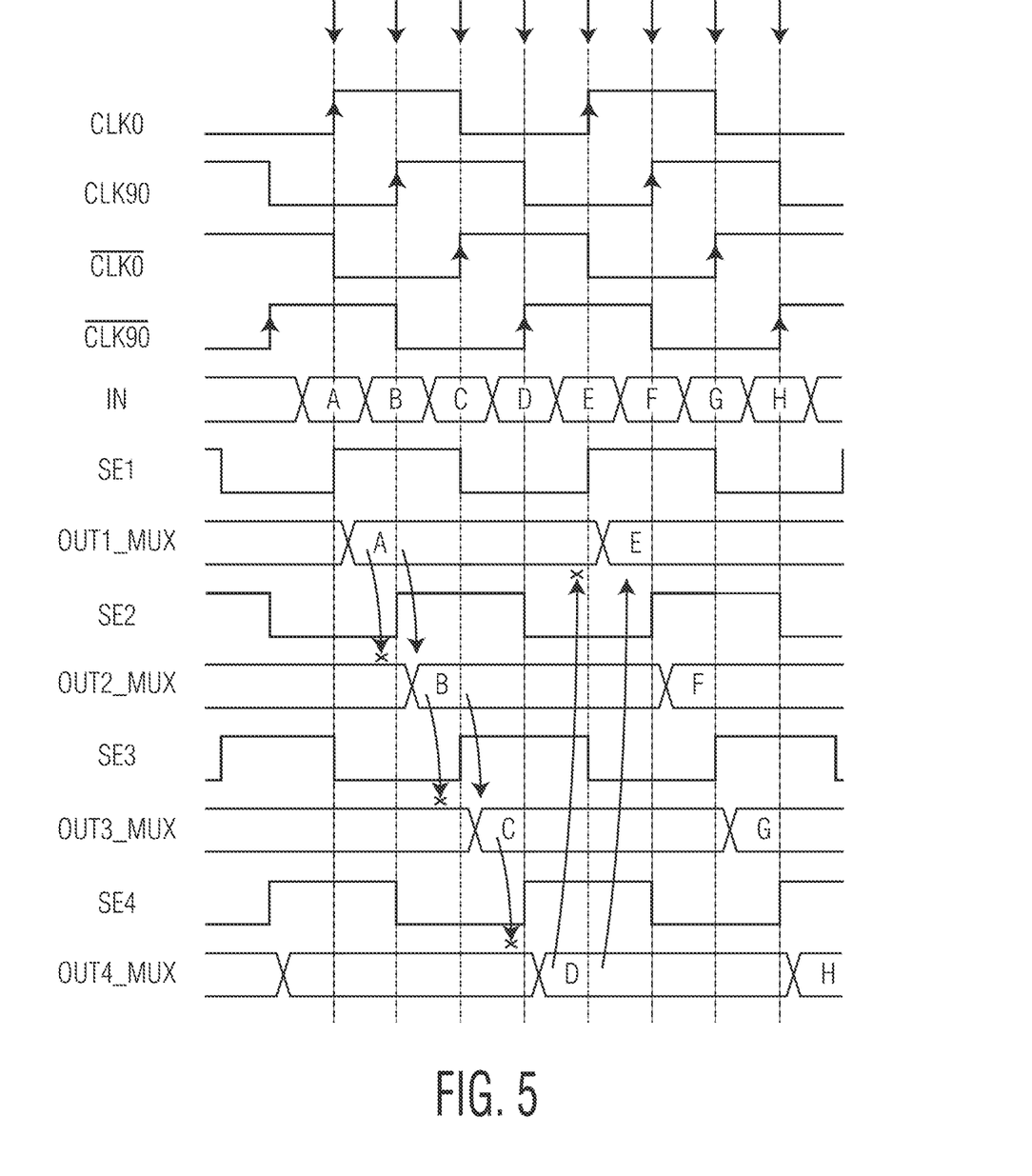
FIG. 5 shows another embodiment of a timing diagram of the decision feedback equalizer, as depicted in FIG. 2.

FIG. 5 is a timing diagram illustrating the operation of the decision feedback equalizer depicted in FIG. 2. The input of the decision feedback equalizer is depicted as "IN" and illustrates a bitstream of values represented by A, B, C, D, E, F, G and H. Each of A, B, C, D, E, F, G and H represent a bit value. As described above, the slices operate in parallel but according to offset clock phases depicted as CLK0, CLK90, etc. The first slice samples the first bit A, as illustrated at OUT1_MUX. Without the selection enable input (i.e., SE1, SE2, SE3, SE4 of FIG. 2), a race condition may result where the output of the first slice "A" propagates through the remaining multiplexers (i.e., M2, M3, and M4 of FIG. 2) and causes a state change in the multiplexer of a different slice before its output is resampled by the latch. However, the selection enable input is configured to cause each multiplexer to be insensitive to its selection input for a fraction of the clock cycle. This avoids the propagation of the multiplexer outputs through the multiplexer chain, as depicted in FIG. 5 by arrows that terminate with an "x," which indicate the value "A" does not propagate.

The SE1 signal, in one embodiment, is synchronized with the CLK0 signal. When the SE1 signal is low, the multiplexer of the first slice is insensitive to its selection input and cannot change its output value. When the SE1 signal becomes high, the multiplexer of the first slice becomes sensitive to its selection input and the output of another slice (in the depicted diagram, the output of MUX4 [OUT4_MUX]) can change the selection of MUX1. It should be noted that FIGS. 4 and 5 depict examples using 50% duty-cycle clocks for example only, and not for limitation to this embodiment of 50% duty-cycle clocks.

In an embodiment, each slice consists of $2^N$ sampler circuits, a $2^N$:1 multiplexer and a latch, where N is the number of speculative taps. For example, in a case of 1 speculative tap, there will be 2 sampler circuits and a 2:1 multiplexer in every slice. In a case of 2 speculative taps, there will be 4 sampler circuits and a 4:1 multiplexer in every slice. In a case of 3 speculative taps, there will be 8 sampler circuits and an 8:1 multiplexer in every slice, and so on. A $2^N$:1 multiplexer has $2^N$ data inputs, N selection inputs and one output. In the case of N speculative taps, every multiplexer has N selection inputs coming from the outputs of N multiplexers in the adjacent slices (or in other words the output of each multiplexer has to be connected to the selection inputs of N adjacent multiplexers). In an embodiment, in the case of more than one direct-feedback tap, the summers receive the outputs of more latches to sum multiple direct-feedback corrections to the input signal. Multiple corrections would come from the outputs of latches from multiple slices, representing different bits sampled in the past.

Figure 6:
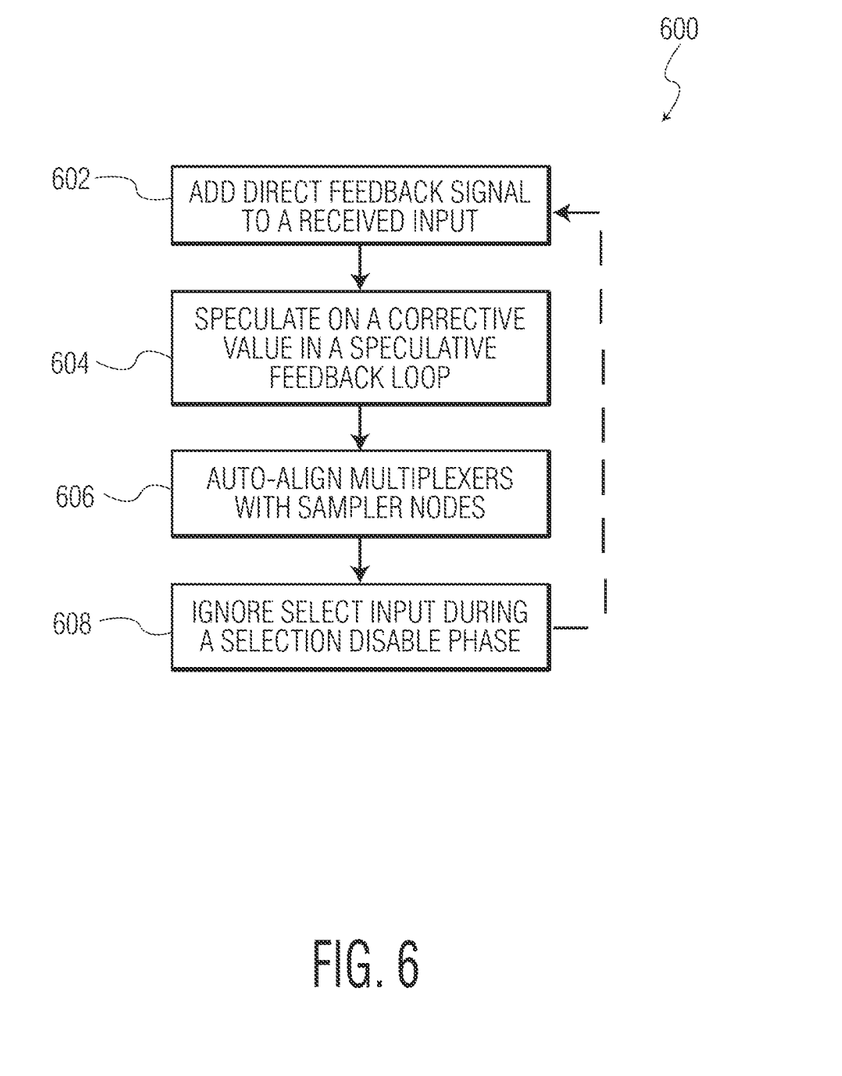
FIG. 6 shows a process flow diagram that illustrates a method for operating a decision feedback equalizer, in accordance with an embodiment of the invention.

FIG. 6 is a process flow diagram 600 that illustrates a method for operating a decision feedback equalizer in accordance with an embodiment of the invention. The decision feedback equalizer may be the decision feedback equalizer 100 described in FIG. 1B, the decision feedback equalizer 200 depicted in FIG. 2 or the decision feedback equalizer 300 depicted in FIG. 3.

At block 602, a direct feedback signal is added to a received input in a direct feedback loop. In one embodiment, the direct feedback loop includes summers, sampler circuits, multiplexers and latches. The summers are configured to receive a direct feedback signal from a corresponding latch and add a correction to a received input.

At block 604, a corrective value is tentatively speculated on a speculative feedback loop. The speculative feedback loop may include sampler circuits with non-zero thresholds and multiplexers. In one embodiment, the multiplexers include an output coupled with a corresponding latch and a selection input of an adjacent multiplexer. Each of the multiplexers is configured with a selection enable phase and a selection disable phase.

At block 606, the multiplexer outputs are auto-aligned with the decisions of the sampler circuits of the corresponding slice. At block 608, the selection input is ignored by the multiplexers during the selection disable phase. The method 600 then ends.

The process is a continuous process, utilizing feedback paths/loops as described above, and does not necessarily have a fixed start or end point per se. Although the operations of the method herein are shown as a sequential process in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages or similar language does not imply that all of the features and advantages that may be realized with the present invention should be or are in any single embodiment. Rather, language referring to the features and/or advantages is understood to mean that a specific feature, advantage or characteristic described in connection with an embodiment is included in at least one embodiment. Thus, discussions of the features and advantages, and similar language throughout this specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure or characteristic described in connection with the indicated embodiment is included in at least one embodiment. Thus, the phrases "in one embodiment," "in an embodiment," and similar language throughout this specification may, but do not necessarily, all refer to the same embodiment.

Various blocks, modules, slices or other circuits may be implemented to carry out one or more of the operations and activities described herein and/or shown in the figures. In these contexts, a "block" (also sometimes "logic circuitry," "module," or "slice") is a circuit that carries out one or more of these or related operations/activities (e.g., sampling and equalization processes). For example, in certain of the above-discussed embodiments, one or more circuits/slices are discrete logic circuits or programmable logic circuits configured and arranged for implementing these operations/activities. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, a decision feedback equalizer may be modified to include more or fewer taps in each slice, or more or fewer slices. Such modifications do not depart from the true spirit and scope of various aspects of the invention, including aspects set forth in the claims.

What is claimed is:

1. An apparatus comprising:
    a plurality of time-interleaved slices for receiving an input data stream, each of the plurality of time-interleaved slices including at least a sampler circuit, a multiplexer and a latch, and each being configured and arranged to provide a selection signal, the selection signal for use by one or more other ones of the plurality of time-interleaved slices at times designated uniquely for the one or more time-interleaved slices; and
    in each of the plurality of time-interleaved slices,
        the multiplexer and the sampler circuit being configured and arranged to provide, in response to an enable input signal and one of the selection signals, sampled output data that is updated as data becomes available from the sampler circuit and corresponding to one of a plurality of different versions of the input data stream at times that are interleaved with times at which other ones of the plurality of time-interleaved slices are configured and arranged to provide sampled output data, the multiplexer has a selection enable phase in which selection is responsive to the selection signals and has a selection disable phase, having a duration greater than a unit interval in the data input stream, in which changes in selection are inhibited, and the latch being configured and arranged to provide a controlled output, in response to the multiplexer and the sampler circuit and corresponding to the updated sampled output data, as a function of the designated unique times.

2. The apparatus of claim 1, wherein:
the plurality of time-interleaved slices are configured and arranged to implement a decision feedback equalization circuit, in which feedback is provided through the selection signals respectively provided by the plurality of time-interleaved slices, and wherein the multiplexer and the sampler circuit are further configured and arranged to provide the sampled output data as contiguous sets of data; and the multiplexer is disabled for respective time periods preceding each of the times designated uniquely for the time-interleaved slice.

3. The apparatus of claim 2, wherein for each of the plurality of time-interleaved slices
the sampler circuit is configured and arranged to sample the input data stream at a fraction of a symbol rate of the input data stream, and
the designated unique times are separated by one symbol period of the symbol rate.

4. The apparatus of claim 1, wherein in each of the plurality of time-interleaved slices, the multiplexer is configured and arranged to output one of the plurality of different versions of the input data stream that is indicated by the selection signals, and wherein signal selection performed by the multiplexer is disabled for respective time periods preceding each of the times designated uniquely for the time-interleaved slice.

5. The apparatus of claim 1, wherein:
the plurality of time-interleaved slices are configured and arranged to implement a decision feedback equalization circuit having N speculative taps in each of the plurality of time-interleaved slices, N ≥1;
each of the plurality of time-interleaved slices includes 2N sampler circuits;
the respective multiplexer in each of the plurality of time-interleaved slices includes at least 2N inputs connected to receive data sampled by the 2N sampler circuits;
the multiplexer includes at least N selection inputs driven by respective outputs of N multiplexers of other ones of the plurality of time-interleaved slices; and
the output of the multiplexer is auto-aligned with sampling performed by the 2N sampler circuits.

6. The apparatus of claim 5, wherein the number of speculative taps, N, is greater than or equal to 2.

7. The apparatus of claim 1, wherein each of the plurality of time-interleaved slices further includes a direct feedback loop comprising at least one summer circuit configured and arranged to add one or more feedback signals derived from the outputs of the time-interleaved slices to the input data stream.

8. An apparatus, comprising:
at least two time-interleaved slices, each of the time-interleaved slices comprising at least two sampler circuits configured and arranged to sample different versions of an input data stream, a multiplexer, and a latch;
a speculative feedback connection coupling the at least two time-interleaved slices via the multiplexer of each of the at least two time-interleaved slices, wherein the multiplexer is configured and arranged to
select one of the at least two sampler circuits according to one or more respective selection signals, the selection signals being derived from outputs of other multiplexers in other ones of the at least two time-interleaved slices, the selection being enabled during a selection enable phase and disabled during a selection disable phase having a duration greater than a unit interval in the input data stream; and
output data from the selected one of the at least two sampler circuits coupled to the latch.

9. The apparatus of claim 8, wherein the output of the multiplexer is auto-aligned with sampling performed by the at least two sampler circuits of the corresponding slice.

10. The apparatus of claim 8, wherein a beginning of the selection enable phase is aligned with a beginning of a latching phase of the at least two sampler circuits.

11. The apparatus of claim 8, further comprising a direct feedback loop comprising at least one summer circuit configured and arranged to add one or more feedback signals derived from the outputs of the time-interleaved slices to the input data stream.

12. A method, comprising:
sampling an input data stream with a plurality of time-interleaved slices, each of the plurality of time-interleaved slices including, a plurality of sampler circuits, a multiplexer, and a latch;
for at least one of the plurality of time-interleaved slices, speculating a corrective value in a speculative feedback loop by using the multiplexer of said at least one of the plurality of time-interleaved slices to select one of the plurality of sampler circuits, as a function of output signals from one or more multiplexers of one or more others of the plurality of time-interleaved slices, and output data from the selected one of the plurality of sampler circuits; and
disabling changes in the selection during a time period before the data from the sampler circuits of the corresponding slice becomes available, wherein the time period when changes in the selection is disabled is greater than a unit interval in the input data stream.

13. The method of claim 12, wherein the plurality of time-interleaved slices form a decision feedback equalization circuit, in which corrective values are selected in each time interleaved slice according to one or more feedback signals derived from the output signals from the one or more multiplexers of one or more others of the plurality of time-interleaved slices.

14. The method of claim 13, wherein:
each of the plurality of time-interleaved slices implements N speculative taps; and
the sampling is performed using 2N sampler circuits to sample different versions of the input data stream at times designated uniquely for the time-interleaved slice, each of the different versions having a different correction signal applied to the input data stream.

15. The method of claim 13, wherein the disabling of changes in the selection of the multiplexer includes disabling changes in the selection of the multiplexer for a time period prior to each time designated uniquely for the time-interleaved slice.

16. The method of claim 15, wherein the unit interval has a duration that is greater than or equal to a symbol period of the input data stream.

17. The method of claim 12, wherein:
the input data stream includes symbols.

18. The method of claim 12, wherein
the multiplexer is configured and arranged to disable changes in the selection in response to a selection enable signal; and
further comprising latching data input during the selection enable phase, and resetting the outputs during the selection disable phase.

19. The method of claim 12, further comprising adding direct feedback corrections at an input of the sampler circuits in each of the plurality of time-interleaved slices via a direct feedback loop.

* * * * *